United States Patent
Scholich-Tessmann et al.

(10) Patent No.: US 8,480,300 B2
(45) Date of Patent: Jul. 9, 2013

(54) DEVICE FOR ANALYZING A BEAM PROFILE OF A LASER BEAM

(75) Inventors: Wolfgang Scholich-Tessmann, Boeblingen (DE); Marcelo Cabaleiro Martins, Aachen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 12/917,643

(22) Filed: Nov. 2, 2010

(65) Prior Publication Data

US 2011/0075698 A1   Mar. 31, 2011

Related U.S. Application Data

(63) Continuation of application No. PCT/EP2009/002665, filed on Apr. 9, 2009.

(30) Foreign Application Priority Data

May 2, 2008   (DE) .......................... 10 2008 022 015

(51) Int. Cl.
*G01K 7/00* (2006.01)
*G01K 3/00* (2006.01)
*G01J 5/00* (2006.01)

(52) U.S. Cl.
USPC ........... 374/178; 374/110; 374/112; 374/166; 374/137; 374/124

(58) Field of Classification Search
USPC .................. 374/166, 110, 112, 178, 137, 124
See application file for complete search history.

(56) References Cited

U.S. PATENT DOCUMENTS

| | | | |
|---|---|---|---|
| 3,939,706 A | 2/1976 | Pinson | |
| 4,463,262 A | 7/1984 | Contreras | |
| 5,132,528 A | 7/1992 | Barton et al. | |
| 5,261,747 A * | 11/1993 | Deacutis et al. | 374/137 |
| 6,809,320 B2 | 10/2004 | Iida et al. | |

(Continued)

FOREIGN PATENT DOCUMENTS

| | | |
|---|---|---|
| CN | 1662341 A | 8/2005 |
| EP | 0457024 A2 | 11/1991 |

(Continued)

OTHER PUBLICATIONS

Translation of WO 2006/103104 A1 (Oct. 5, 2006).*

(Continued)

*Primary Examiner* — Mirellys Jagan
(74) *Attorney, Agent, or Firm* — Fish & Richardson P.C.

(57) ABSTRACT

A device for analyzing a beam profile of a laser beam includes a carrier plate, a plurality of first temperature-sensitive measuring elements, in particular diodes, which are arranged in a preferably matrix-like arrangement on a first side of the carrier plate at a plurality of measuring locations, and a plurality of second temperature-sensitive measuring elements, in particular diodes, which are arranged in another preferably matrix-like arrangement on a second side of the carrier plate. One of the first measuring elements is arranged in each case opposite one of the second measuring elements and is thermally coupled to the first measuring element using strip conductors which extend through the carrier plate. Such a device can be included in a laser processing machine and used in an associated method for analyzing a beam profile of a laser beam.

8 Claims, 2 Drawing Sheets

U.S. PATENT DOCUMENTS

| | | | |
|---|---|---|---|
| 7,045,752 B2 | 5/2006 | Posamentier et al. | |
| 7,651,264 B2 | 1/2010 | Matsumoto et al. | |
| 2005/0269302 A1 | 12/2005 | Horn | |
| 2007/0181650 A1* | 8/2007 | Yoo et al. | 228/101 |

FOREIGN PATENT DOCUMENTS

| | | |
|---|---|---|
| EP | 1605237 A1 | 12/2005 |
| JP | 02038931 A | 2/1990 |
| WO | 2006103104 A1 | 10/2006 |

OTHER PUBLICATIONS

Notification of Transmittal of Translation of the International Preliminary Report on Patentability from corresponding PCT Application No. PCT/EP2009/002665, mailed Nov. 10, 2010, 7 pages.

Office Action from corresponding German Application No. 10 2008 022 015.9-52, mailed Mar. 10, 2009, with English translation, 5 pages.

* cited by examiner

DEVICE FOR ANALYZING A BEAM PROFILE OF A LASER BEAM

CROSS-REFERENCE TO RELATED APPLICATIONS

This application is a continuation of and claims priority under 35 U.S.C. §120 to PCT/EP2009/002665, filed on Apr. 9, 2009, and designating the U.S., which claims priority under 35 U.S.C. §119 to German Patent Application No. 10 2008 022 015, filed on May 2, 2008. The contents of the prior applications are hereby incorporated by reference in their entirety.

TECHNICAL FIELD

The disclosure relates to a device for analyzing a beam profile of a laser beam, a laser processing machine having at least one such device and an associated method for analyzing a beam profile of a laser beam.

BACKGROUND

In laser processing machines, it is typically necessary to measure a laser beam—ideally online, that is to say, during the laser processing operation—in terms of its properties such as power, beam position and beam diameter and/or intensity distribution. To this end, commercially available measuring devices already exist but they are often only suitable for use in a laboratory owing to their price and low level of robustness. In such a measuring device, for example, a small rapidly moved needle is commonly used in order to decouple a small portion of the laser radiation and redirect it to a rapid infrared detector. This needle can experience wear during extended use. Therefore such a measuring device typically has only limited suitability for long-term use in laser processing machines.

An alternative method for measuring the intensity profile of a laser beam uses a partially transparent redirecting mirror in the beam path of the laser beam in order to decouple a small portion of the beam power which substantially corresponds to the losses of the mirror, to a high-sensitivity resolution detector.

SUMMARY

Devices for analyzing a beam profile of a laser beam, laser processing machines having at least one such device and associated methods for analyzing a beam profile of a laser beam are disclosed. Embodiments can allow the analysis of a beam profile of a laser beam using a device which is cost-effective to produce and which has a small thermal time constant.

In general, in one aspect, the invention features a device for analyzing the beam profile of a laser beam, including a carrier plate, a plurality of first temperature-sensitive measuring elements, in particular diodes, which are arranged in a preferably matrix-like arrangement on a first side of the carrier plate at a plurality of measuring locations, and a plurality of second temperature-sensitive measuring elements, in particular diodes, which are arranged in a preferably matrix-like arrangement on a second side of the carrier plate, one of the first measuring elements being arranged in each case directly opposite one of the second measuring elements and being thermally coupled to the first measuring element using strip conductors which extend through the carrier plate.

The temperature-sensitive measuring elements which are arranged at the measuring locations can have at least one property which changes in accordance with the temperature, that is to say, in accordance with the incident radiation power. As temperature-sensitive measuring elements, it is possible to use, for example, electronic components with a temperature-dependent electrical parameter. For the measurement, semiconductor structural elements, for example, diodes, are particularly suitable since their on-state voltage, when supplied with a constant electrical current, changes in a substantially linear manner in accordance with the temperature in a specific temperature range. In some embodiments, conventional resistors, in particular in thin-coating technology, or thermo-elements (for example, bi-metal strips) can also be used as measuring elements.

In order to reduce the thermal coupling and the thermal time constant of the measuring elements, a carrier plate or a carrier substrate, for example, a circuit board, is not only provided with an arrangement of measuring elements at the front side thereof but is also provided at the rear side thereof with exactly the same arrangement of measuring elements. Directly opposing pairs of measuring elements on the front and rear side of the carrier plate are in each case connected to each other in a thermally and electrically conductive manner using metal strip conductors which extend through the carrier plate in the region of or at the measuring locations. Although additional strip conductors which are fitted to the carrier plate can also be provided for the electrically conductive connection of the measuring elements in order to enable reading out of the measuring elements, the thermal couplings produced in this instance apply in the same manner to the elements of the upper and the lower side. Smearing of the thermal image of the laser beam can consequently be prevented if the temperature profile measured at the rear side of the carrier plate is subtracted from that at the front side.

If the device is exposed to the laser beam at the first side, for example, by being arranged downstream of a suitable redirecting mirror in the beam guide of a laser processing machine, there exists a thermal coupling of the individual measuring elements (diodes) at the front side of the circuit board with respect to their corresponding measuring elements (diodes) at the lower side, so that the temperature difference at diode pairs, which are not exposed to laser power, is almost zero. The temperature difference between a diode on the front side and the associated diode at the rear side of the circuit board is therefore a measurement for the laser power directed at the front side. Owing to this configuration of the detector, the effective thermal time constant is reduced relative to a diode matrix at only one side of the carrier plate substantially by a factor of from 3 to 5 and the thermal coupling measured between adjacent diodes on the same side is reduced substantially by a factor of 5.

In certain embodiments, the carrier plate has at least one thermally conductive layer for heat dissipation, the thermally conductive layer not being connected to the strip conductors which extend through the carrier plate. Generally, one or two thermally conductive layers which include a metal, preferably copper (high thermal conductivity k of approximately 350 W/(m K)), are fitted for heat dissipation in the center of the carrier substrate, that is to say, between the two matrix-like arrangements in order to increase the power stability of the device. At the outer sides of the carrier substrate, heat sinks are arranged together with the thermally conductive layers in this instance. It will be appreciated that the heat dissipation is intended to act in the same manner along the layers at both sides of the device, for which reason the layer(s) typically extend symmetrically relative to the centre plane of the carrier plate. In addition or alternatively, heat dissipation can also be achieved by both sides of the carrier plate being cooled in the same manner by a flow of gas, in particular a flow of air, being directed over.

In some embodiments, mutually opposing first and second measuring elements are connected in an anti-parallel manner so that the cathode of a first diode is connected in an electrically conductive manner to the anode of a second diode, and vice-versa. With such an anti-parallel arrangement of the diodes, it is possible, with appropriate selection of the polarity of the current used for measurement, to measure the temperature-dependent voltage of the first diode of a diode pair since the second diode is operated in the non-conducting direction so that it does not contribute to the measurement. By reversing the current direction, it is possible to subsequently measure the temperature-dependent voltage of the second diode, the first diode being operated in the non-conducting direction in this instance.

In certain embodiments, the diodes are in the form of SMD diodes. The device can be produced particularly cheaply when the superficial temperature measurement is carried out with very small and cheap SMD (surface mounted device) diodes. In that manner, it is possible to produce a detector having a measurement field of, for example, 50 mm×50 mm, at low cost in order to analyze a laser beam having a diameter of 30 mm.

The first and/or second measuring elements can be connected to each other in an electrically conductive manner in rows and columns of the first matrix-like arrangement and/or the second matrix-like arrangement. In that manner, the individual measuring elements of each row or each column can be addressed using a suitable evaluation logic unit for the readout. As set out above, a single connection matrix is sufficient when diodes connected in an anti-parallel manner are used in order to read out both the diodes at the first side and the diodes at the second side.

In general, in a further aspect, the invention features a laser processing machine having a generation unit for generating a laser beam and having at least one device as described above which serves to analyze the beam profile of the laser beam. In this instance, the measurement is generally carried out directly in the unfocused laser beam, that is to say, without an optical focusing unit arranged therebetween. In this instance, the device can measure the intensity distribution in a two-dimensional field, that measuring field being intended to be selected so as to be slightly larger than the laser beam to be measured in order to be able to establish, for example, deviations of the beam position. The above-described device can be used in the laser processing machine in order to measure and to monitor the laser beam online. It is consequently possible to adjust the pointing of the laser beam if corresponding actuation members that can change the beam position selectively are available in the laser processing machine.

In some embodiments, the laser processing machine includes a partially transparent redirecting mirror for decoupling a portion of the laser beam onto the device for analyzing the beam profile. In the case of the high laser powers which are typically used in laser processing machines, it may be advantageous to decouple only a small portion (e.g., approximately 1%) of the laser power and to direct it onto the device in order to protect it from destruction owing to excessively great heat development and, at the same time, to have only a small power loss of the laser beam.

In general, in a further aspect, the invention features a method for analyzing a beam profile of a laser beam that includes directing the laser beam onto a first side of a carrier plate, on which a plurality of first temperature-sensitive measuring elements, in particular diodes, are arranged at a plurality of measuring locations in a preferably matrix-like arrangement, and determining the intensity of the laser beam at a measuring location by comparing a temperature-dependent property of a first measuring element with a temperature-dependent property of a second temperature-sensitive measuring element, in particular a diode, which is arranged on a second side of the carrier plate opposite the first measuring element and which is thermally coupled to the first measuring element using strip conductors which extend through the carrier plate. The difference in the measuring values or the measuring signals of the temperature-dependent property, in particular the temperature-dependent voltage drop, at two mutually opposed measuring elements is in this instance a measurement for the laser power which is directed onto the first side of the device.

In some embodiments, the cathode of a first diode is connected to the anode of a second diode arranged oppositely, and vice-versa, and the current direction through the two diodes is reversed between the measurement of the temperature-dependent voltage drop of the first diode and the measurement of the temperature-dependent voltage drop of the second diode. In that manner, the temperature-dependent voltage drop of the diodes can be measured using a single connection matrix both at the front side and at the rear side of the carrier plate.

The heat introduced to the carrier plate can be dissipated by at least one thermally conductive layer within the carrier plate and/or by a gas flow over both sides of the carrier plate so that the cooling effect at both sides of the carrier plate is symmetrical. The term "symmetrical cooling effect" means that the cooling has the same effect on the temperature of measuring elements arranged opposite each other so that the cooling does not have any effect on determining the intensity of the laser beam by comparison, in particular by subtraction of the temperature-dependent property of the mutually opposed measuring elements.

Further advantages will be appreciated from the description and the drawings. The features set out above and those set out below may also be used individually or together in any combination. The embodiments shown and described are not intended to be understood to be an exhaustive listing, but are instead of exemplary character for describing the invention.

DETAILED DESCRIPTION

Figure 1:
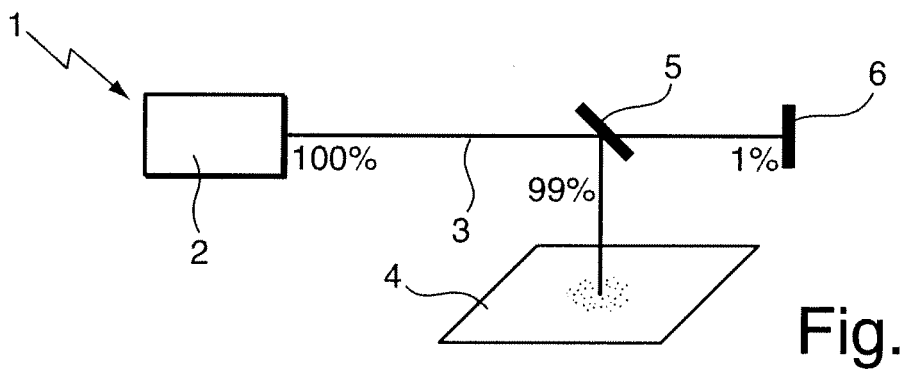
FIG. 1 is a schematic illustration of an embodiment of a laser processing machine having a device for analyzing the beam profile.

FIG. 1 shows a laser processing machine 1 having a laser resonator 2 for producing a laser beam 3. The laser beam 3 is focused on a workpiece 4 using a beam guiding optical unit (not shown) in order to carry out thereon a laser processing operation, for example, a laser welding or laser cutting process. In this instance, the laser beam 3 is redirected through 90° at a redirecting mirror 5 between the laser resonator 2 and the workpiece 4. The redirecting mirror 5 is in the form of a beam splitter and reflects approximately 99% of the intensity of the incident laser beam 3. The remaining intensity (approximately 1%) of the laser beam 3 is transmitted by the redirecting mirror 5 and impinges upon a device 6 for analysing the beam profile of the laser beam 3 which is illustrated in detail in FIGS. 2a-c.

Figures 2A, 2B:
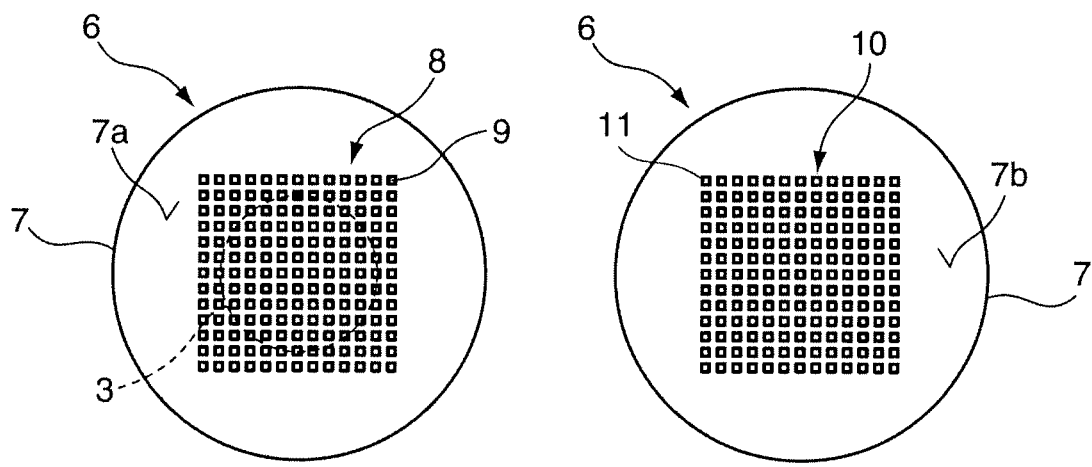
FIGS. 2a-c are a front view, rear view and a sectional view of a carrier plate of the device of FIG. 1 with two matrix-like diode arrangements, respectively.

The device 6 has a circuit board including a plastics material as the carrier plate 7, to the front side 7a of which, as shown in FIG. 2a, a matrix-like arrangement 8 of temperature-sensitive measuring elements in the form of first diodes 9 is fitted. The laser beam 3 impinges upon the carrier plate 7 in the region of the matrix-like arrangement 8. The surface-area which is covered by the matrix-like arrangement 8 on the carrier plate 7 is selected in this instance so as to be slightly greater than the cross-sectional surface-area of the laser beam 3 generally used in the laser processing machine 1 so that deviations from the ideal beam position of the laser beam 3, that is to say, a central beam position, which is shown in FIG. 2a, can also be determined. The first diodes 9 have a temperature-dependent electrical voltage drop which changes in accordance with the intensity of the incident laser radiation so that the first diodes 9 form a two-dimensional, matrix-like arrangement 8 of measuring locations, by means of which the beam profile, that is to say, the beam intensity, of the laser beam 3 over the beam cross-section, can be established.

In order to reduce the thermal coupling between adjacent first diodes 9 and to reduce the thermal time constant of the first diodes 9, the carrier plate 7 has, as shown in FIG. 2b, a second matrix-like arrangement 10 of second diodes 11 at the rear side 7b thereof. In this instance, the two matrix-like arrangements 8, 10 are of identical form and are positioned directly opposite each other at the front side 7a or the rear side 7b of the carrier plate 7 so that one of the first diodes 9 of the first matrix-like arrangement 8 is arranged directly opposite one of the second diodes 11 of the second matrix-like arrangement 10, respectively.

Figure 2C:
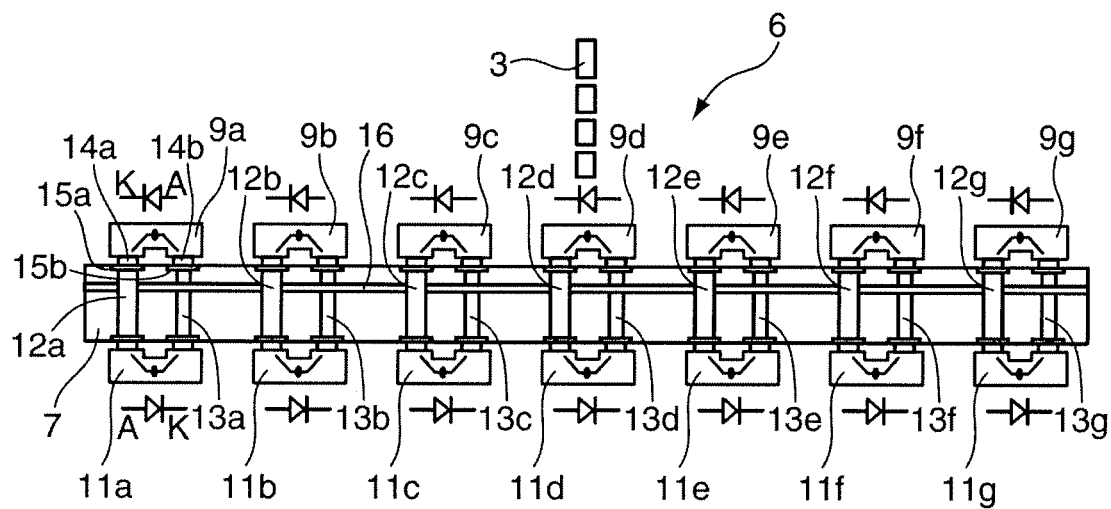

As shown in FIG. 2c with a section through the carrier plate 7 along a row of first and second diodes 9a to 9g and 11a to 11g, respectively, one of the first diodes 9a to 9g is connected in an electrically and thermally conductive manner to an opposite second diode 11a to 11g using first and second strip conductors 12a, 13a to 12g, 13g. In this instance, the first diodes 9a to 9g are connected in an anti-parallel manner relative to the second diodes 11a to 11g, that is to say, the cathode K of a first diode 9a to 9g is connected to the anode A of an opposite second diode 11a to 11g using a first strip conductor 12a to 12g and accordingly the anodes A of the first diodes 9a to 9g are connected to the cathodes K of the second diodes 11a to 11g using a second strip conductor 13a to 13g, respectively.

The term "a thermally conductive connection" means that temperature equalization takes place between opposite first and second diodes 9a to 9g and 11a to 11g using the strip conductors 12a, 13a to 12g, 13g, respectively. Particularly when no laser radiation strikes a first diode 9a to 9g, the temperature difference with respect to an opposite second diode 11a to 11g is intended to be practically zero whilst, when laser radiation strikes the first diodes, there is produced a defined temperature difference with respect to the second diodes.

As illustrated in FIG. 2c, during the measurement a laser beam 3, which is illustrated in a spatially localized manner for simplicity and which acts as a heat source, impinges upon a first diode 9d of the device 6 and heats it, a portion of the heat being transferred to adjacent first diodes 9c and 9e by the carrier plate 7. Another portion of the heat is transmitted to the second diode 11d. The coupling of the first diode 9d with respect to its neighbors 9c and 9e is of the same magnitude as the coupling of the second diode 11d with respect to its neighbors 11c and 11e, respectively. If the difference from the temperature measurement values of the upper side and lower side is calculated for each measuring location, the thermal coupling between the individual measuring locations is significantly reduced as a result.

As is also apparent from FIG. 2c, the first and second diodes 9a to 9g, 11a to 11g are SMD diodes, respectively, which do not have wire connections and which are connected with their connection pins 14a, 14b directly to solder pads 15a, 15b on the carrier plate 7, which is in the form of a printed circuit board (PCB). The small dimensions of the SMD diodes allow a measurement field in a matrix-like arrangement of, for example, 50 mm×50 mm, to be produced at little cost. A laser beam 3 having a diameter of, for example, 30 mm, can be analyzed with a measurement field having such dimensions.

There is formed in the carrier plate 7 a layer 16 of a material (e.g., copper) which has a high thermal conductivity coefficient in order to ensure effective dissipation of the heat produced by the laser beam 3 in the carrier plate 7 towards heat sinks (not shown) which are provided at the edges of the carrier plate, whereby the power stability of the device 6 is increased. Unlike what is shown in FIG. 2c, the layer 16 typically extends centrally in the carrier plate 7 so that the thermal dissipation at both sides of the device occurs in the same manner and does not corrupt the measurement result. In this instance, the significant aspect is that the layer 16 is not connected to the strip conductors 9a to 9g and 11a to 11g, respectively, because otherwise, owing to the electrical connection, it would be impossible to measure the voltage drop of the individual diodes 9a to 9g and 11a to 11g, respectively, and the thermal coupling of adjacent diodes would further be increased. It will be appreciated that it is also possible to provide, in addition or alternatively to the thermally conductive layer 16, a gas cooling system in which both sides 7a, 7b of the carrier plate 7 are cooled in the same manner by a gas or air flow being directed over. It will further be appreciated that other types of cooling are also possible, all the types of cooling having in common the fact that they are intended to have a symmetrical cooling action with respect to the carrier plate 7 or a center plane of the carrier plate 7.

With the device 6 shown in FIGS. 2a-c, the effective thermal time constant with respect to a carrier plate having a single matrix-like arrangement of diodes which is only fitted to the front side 7a thereof can be reduced by a factor of from 3 to 5 and the thermal coupling measured between adjacent first diodes 9 and second diodes 11 can be reduced by a factor of 5.

Figure 3:
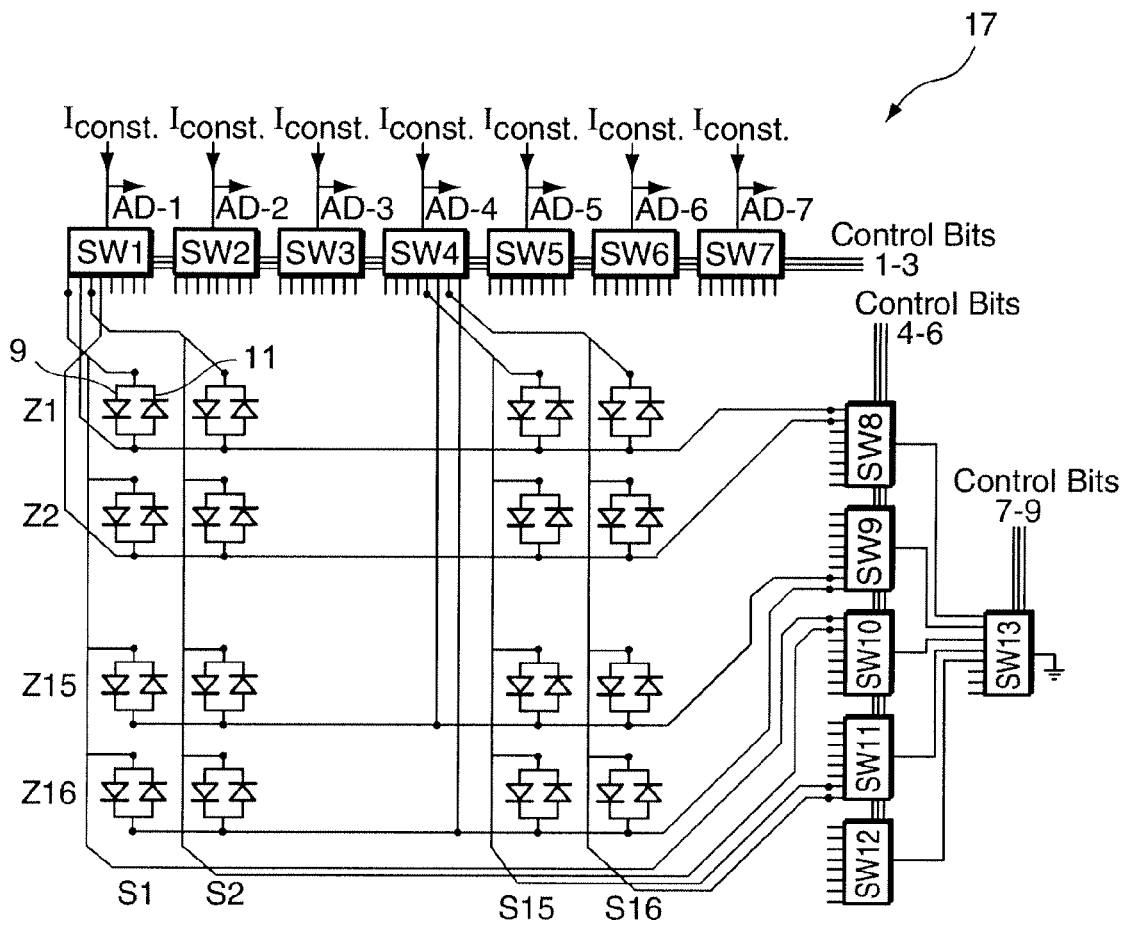
FIG. 3 is a circuit diagram of a measuring device for establishing the temperature-dependent resistance of the diodes of FIGS. 2a-c.

In order to determine the temperature of the first and second diodes 9, 11 in accordance with the intensity of the laser radiation, the device 6 has a measuring device 17 which is shown in FIG. 3. The measuring device 17 includes a plurality of switching elements, for example, SW1 to SW13 in the drawing, in the form of digital modules which have eight outputs and one input which is connected to a single one of the eight outputs in accordance with three control bits. The switching elements SW1 to SW13 serve to evaluate individual diodes of the diodes 9 and 11 which are connected in the form of a matrix. The drawing shows by way of example sixteen rows Z1 to Z16 and columns S1 to S16 with diodes 9 and 11, respectively. A constant current $I_{const}$ which is connected to one of the outputs in accordance with three first control bits 1 to 3 is present in this instance at the inputs of the first switching elements SW1 to SW7 which are arranged in a row. At each output of the switching elements SW1 to SW7, there is a column line with diodes 9 and 11, respectively, of which columns S1 to S16 are shown in FIG. 3 by way of example. Using another switching element SW13, an earth potential which is present at the input thereof can be applied, using three other control bits 7 to 9, to an input of further switching elements which are arranged in a column and of which five (SW8 to SW12) are shown in FIG. 3 by way of example. Using three further control bits 4 to 6, one of the eight outputs of the five further switching elements SW8 to SW12 can be provided with earth potential. One of the outputs of the further switching elements SW8 to SW12 is connected in an electrically conductive manner to a row (for example, Z1 to Z16) of the pairs of first and second diodes 9, 11 connected in an anti-parallel manner. It will be appreciated that the electrically conductive connections between first diodes 9 and second diodes 11 arranged beside each other have a thermal configuration which produces the same conditions at the front side and the rear side for the coupling between adjacent diodes so that the thermal coupling of the measurement values is significantly reduced by subtraction of the temperature measurement values of the front side and the rear side at each measuring location.

The first switching elements SW1 to SW7 are also connected with their outputs to a connection of the diode pairs 9, 11 in such a manner that a diode pair to be measured can be selected using the control bits 1 to 9 by way of the row or column thereof, for example, the first diode pair 9, 11 in the first row Z1 and the first column S1. The direct current $I_{const}$ applied in this instance flows only through one diode, for example, through the first diode 9, because the current flow through the second diode 11 is blocked due to the anti-parallel connection so that there is only a voltage drop across the first diode 9. If the current direction of the current $I_{const}$ is inverted, the current $I_{const}$ accordingly flows only through the second diode 11 so that the voltage drop across that diode can be measured. The temperature of the diodes is calculated from the voltage drop. A measurement for the intensity of the laser beam 3 impinging upon the first diode 9 results from the difference between the temperature measured at the first diode 9 and the second diode 11. Owing to the anti-parallel, electrical connection of the diodes 9, 11, a single electrical connection matrix is sufficient to read out both the diodes 9 at the front side 7a and the diodes 11 at the rear side 7b of the carrier plate 7.

The above-described device 6 can be used, for example, in the laser processing machine 1 shown in conjunction with FIG. 1 in order to measure and to monitor the laser beam 3 online, that is to say, while the workpiece 4 is being processed. In particular, the position of the laser beam 3 can be detected and the pointing or beam position of the laser beam 3 can be changed or controlled selectively by actuation members (pivotable mirrors, etc.) (not shown) in the laser processing machine 1. It will be appreciated that the beam intensity of the laser beam 3 can thereby also be determined and optionally controlled online.

It is apparent that modifications of the above-described device 6 which also allow measurement with a small temperature constant are also possible. For instance, it is also possible to provide, in place of the diodes 9, 11, other types of temperature-sensitive measuring elements, for example, thermo-elements, on the carrier plate 7. It is also not necessary to have an equidistant arrangement of the measuring locations or the diodes 9, 11 in order to analyze the beam profile of the laser beam. However, it is important in each case that a defined thermal connection between opposite measuring elements be ensured using the strip conductors which extend through the carrier plate.

A number of embodiments have been described. Nevertheless, it will be understood that various modifications may be made. Accordingly, other embodiments are within the scope of the following claims.

What is claimed is:

1. A device for analyzing a beam profile of a laser beam, the device comprising:
    a carrier plate;
    a plurality of first temperature-sensitive measuring elements arranged in a first matrix arrangement on a first side of the carrier plate at a plurality of measuring locations; and
    a plurality of second temperature-sensitive measuring elements arranged in a second matrix arrangement on a second side of the carrier plate opposite the first side,
    wherein each one of the first temperature-sensitive measuring elements is arranged directly opposite a corresponding one of the second temperature-sensitive measuring elements,
    wherein, for each directly opposing pair of temperature-sensitive elements, the first temperature-sensitive measuring element and the corresponding second temperature-sensitive measuring element are thermally and electrically connected to one another by strip conductors extending through the carrier plate, such that the thermal connection establishes an approximately zero temperature difference between the first temperature-sensitive measuring element and the second temperature-sensitive measuring element, and
    wherein the plurality of first temperature sensitive elements comprises a plurality of first diodes, the plurality of second temperature-sensitive elements comprises a plurality of second diodes, and each second diode being connected in an anti-parallel manner to a corresponding first diode opposing the second diode, such that a cathode of the corresponding first diode is electrically connected to an anode of the second diode, and a cathode of the second diode is electrically connected to an anode of the corresponding first diode.

2. The device according to claim 1, wherein the carrier plate has at least one thermally conductive layer for heat dissipation, the thermally conductive layer not being connected to the strip conductors which extend through the carrier plate.

3. The device according to claim 1, wherein each of the first diodes and each of the second diodes comprise a surface mounted device (SMD) diode.

4. The device according to claim 1, wherein each of the first temperature-sensitive measuring elements in the first matrix arrangement are electrically connected to one another in rows and columns and each of the second temperature-sensitive measuring elements in the second matrix arrangement are electrically connected to one another in rows and columns.

5. A laser processing machine comprising:
    a generation unit for generating a laser beam; and
    at least one device to analyze a beam profile of the laser beam during operation of the laser processing machine, wherein the at least one device includes:
    a carrier plate;
    a plurality of first temperature-sensitive measuring elements in a first matrix arrangement on a first side of the carrier plate at a plurality of measuring locations; and
    a plurality of second temperature-sensitive measuring elements arranged in a second matrix arrangement on a second side of the carrier plate opposite the first side,
    wherein each one of the first temperature-sensitive measuring elements is arranged directly opposite a corresponding one of the second temperature-sensitive measuring elements, and wherein, for each directly opposing pair of temperature-sensitive elements, the first temperature-sensitive measuring element and the corresponding second temperature-sensitive measuring element are thermally and electrically connected to one another by strip conductors extending through the carrier plate, such that the thermal connection establishes an approximately zero temperature difference between the first temperature-sensitive measuring element and the second temperature-sensitive measuring element when the temperature-sensitive elements are not exposed to the laser beam.

6. The laser processing machine according to claim 5, further comprising a partially transparent redirecting mirror configured to decouple a portion of the laser beam onto the device during operation of the laser processing machine.

7. A device for analyzing a beam profile of a laser beam, the device comprising:
- a carrier plate;
- a plurality of first temperature-sensitive measuring elements arranged in a first matrix arrangement on a first side of the carrier plate at a plurality of measuring locations; and
- a plurality of second temperature-sensitive measuring elements arranged in a second matrix arrangement on a second side of the carrier plate opposite the first side,
- wherein each one of the first temperature-sensitive measuring elements is arranged directly opposite a corresponding one of the second temperature-sensitive measuring elements,
- wherein, for each directly opposing pair of temperature-sensitive elements, the first temperature-sensitive measuring element and the corresponding second temperature-sensitive measuring element are thermally and electrically connected to one another by strip conductors extending through the carrier plate, such that the thermal connection establishes an approximately zero temperature difference between the first temperature-sensitive measuring element and the second temperature-sensitive measuring element, and
- wherein each of the first temperature-sensitive measuring elements in the first matrix arrangement are electrically connected to one another in rows and columns and each of the second temperature-sensitive measuring elements in the second matrix arrangement are electrically connected to one another in rows and columns.

8. The device according to claim 7, wherein the carrier plate has at least one thermally conductive layer for heat dissipation, the thermally conductive layer not being connected to the strip conductors which extend through the carrier plate.

* * * * *